United States Patent [19]

Stenström et al.

[11] Patent Number: 4,734,004
[45] Date of Patent: Mar. 29, 1988

[54] SLUICE DEVICE

[75] Inventors: Lennart Stenström, Huddinge; Lennart Wahlström, Tumba; Torsten Malmgren, Huddinge, all of Sweden

[73] Assignee: Alfastar AB, Tumba, Sweden

[21] Appl. No.: 929,197

[22] PCT Filed: Feb. 14, 1986

[86] PCT No.: PCT/SE86/00063
§ 371 Date: Oct. 17, 1986
§ 102(e) Date: Oct. 17, 1986

[87] PCT Pub. No.: WO86/04832
PCT Pub. Date: Aug. 28, 1986

[30] Foreign Application Priority Data

Feb. 18, 1985 [SE] Sweden ................................ 8500754

[51] Int. Cl.$^4$ .............................................. B01J 3/02
[52] U.S. Cl. ..................................... 414/217; 222/368
[58] Field of Search .................... 414/219, 217, 292; 222/368; 406/64, 65, 66, 67

[56] References Cited

FOREIGN PATENT DOCUMENTS 122406  6/1971  Norway .
601039  4/1978  U.S.S.R. .

Primary Examiner—Robert J. Spar
Assistant Examiner—Stuart J. Millman
Attorney, Agent, or Firm—Wegner & Bretschneider

[57] ABSTRACT

A sluice device for insertion between zones having different environmental conditions, for instance pressure and/or temperature. A drum is rotatably arranged in an opening in a housing and has radially displaceable flaps uniformly distributed along the periphery of the drum. Each flap has a first portion for sealing against the housing, and a second portion of the flap, adjacent to the drum, cooperates with a sealing device. The sluice device is formed as a longitudinal groove which is open against the drum, whereby a longitudinal sealing member is arranged in the groove. The pressure difference between spaces at the two sides of the flap brings the longitudinal sealing member in such a sealing position that the flap, by the pressure difference, is placed in sealing abutment against the inside of the housing regardless of the positive or negative pressure difference.

13 Claims, 8 Drawing Figures

SLUICE DEVICE

FIELD OF THE INVENTION

The invention relates to a device for establishing a passage for objects between zones having different environmental conditions for instance pressure and/or temperature. Objects of special interest in this context are such that shall undergo heat stabilization, for instance food products or pharmaceutical compounds.

BACKGROUND OF THE INVENTION

The term heat stabilization involves a number of general processes such as sterilization, pasteurization, cooling, etc.

The heat stabilization thought at first hand in the present context comprises known concepts for refining and improving the efficiency of general processes.

In a stabilization process there may for instance be included a method for fast pre-heating to a temperature distribution in the product suited for microwave treatment. A two-step process comprising contact by a hot medium directly followed by a short contact with a cooler medium may precede or start the microwave treatment.

It is also possible to adjust the temperature profile in advance such that the microwave treatment gives a uniform temperature profile within the product.

A further possibility is to carry out the microwave treatment in water or other liquid and control the water temperature such that the surface temperature increase is suppressed.

Heat stabilization according to the present definition involves a qualified process technology and it is of importance that the physical conditions for the stabilization/process are the correct ones.

OBJECT OF THE INVENTION

The problem according to the invention is to accomplish a sluice device to be inserted between zones having different environments and useful for a desired qualified process from a sealing point of view as well as in view of rational production. Such stipulations mean for instance also flexibility regarding pressure at a respective side of the sluice and also placement of the sluice in the actual process line.

The object of the present invention is to offer a sluice device which meets the requirements of the problem definition.

SUMMARY OF THE INVENTION

The invention provides a sluice device for use in a device for heat stabilization and insertable between zones having different environmental conditions, for instance pressure and/or temperature, comprising a drum that is rotatable in an opening in a housing. The sluice device is distinguished by radially displaceable flaps arranged at uniform mutual distances along the periphery of the drum, in that each flap has a first portion for sealing against the housing, and in that a second portion of the flap, adjacent to the drum, co-operates with a sealing device arranged between said second portion and the drum.

In one embodiment of the invention a joint device interconnects each flap with the drum such that a rotational movement controlled by the joint comprises a radial component of movement of the flap relative the drum. In another embodiment the movement of each flap is controlled by substantially radial grooves in the flange of the drum.

In that case where the sluice device is arranged for allowing passage of a conveyor, there is a conveyor inlet gap arranged between the drum and the housing. Each flap has recesses in said first portion and the conveyor comprises links where joints of the conveyor are arranged for sealing engagement in the recesses.

Preferably the combination of links and drum constitutes the transmission to the conveyor of a driving force from a drive motor driving the drum, preferably by dog members on the links that co-operate with driving members on the drum.

The sealing against the drum is obtained basically by forming a longitudinal groove in said second portion of each flap such that the groove is open towards the drum and arranging a longitudinal sealing member in the groove such that at least a portion thereof may be moved between two positions in the groove.

A pressure difference between spaces on the two sides of the flap brings the longitudinal sealing member in such a sealing position that the pressure difference moves the flap into sealing abutment against the inside of the housing regardless positive or negative pressure difference, with a force having a predetermined relation relative the pressure difference.

In one embodiment the sealing member comprises a list which is flexibly attached to the drum.

In another embodiment the sealing member comprises a string of rubber or similar having a circular cross section.

In a third embodiment the sealing member comprises a U-shaped profile having elastic sealing lips facing each other.

In a fourth embodiment the sealing member comprises a list having two lips on the side of the list facing the drum and an attachment device at the opposite side of the list for attaching the list in a support such that two chambers on each side of the attachment device communicate through openings between the lips.

The arrangement of seals also comprises other seals, preferably seals against the inside of the flanges on the drum at each end of each flap, and axially settable sealing devices between the outside of said flanges and the gables of the housing at each side of the drum.

In one embodiment the sluice device is included in a substantially straight conveyor system comprising a conveyor in a first direction and a conveyor in the return direction, where the conveyor, in sections of the plant where the stabilization process is carried out, is encapsuled in module units, preferably dimensioned for a certain pressure at one side of the sluice device and another pressure at the other side.

For a simple rebuilding of the conveyor system that is encapsuled in the module units, each module unit preferably has a double length corresponding to a predetermined integral number ratio of the length of one link of the conveyor.

SPECIFIC DESCRIPTION

Figure 1:
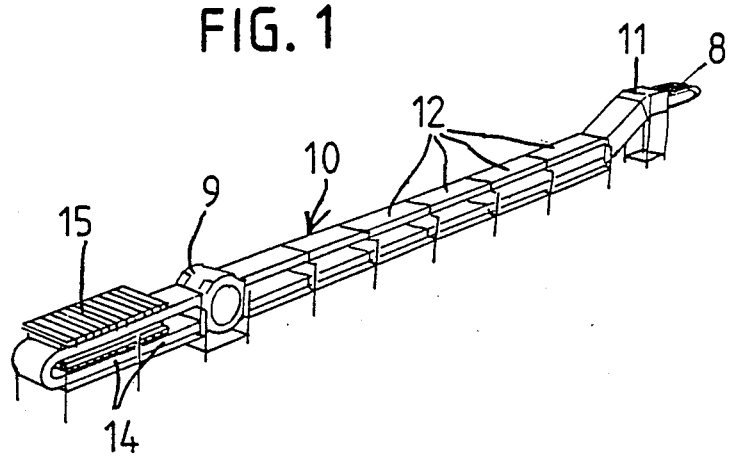
FIG. 1 in a perspective view shows an example of a heat stabilization line where the sluice device according to the invention is included, FIG. 2 in a perspective view shows a housing of the sluice device, FIG. 3 in a schematic partial cross section shows a first type of sealing device between the sluice housing and a drum rotatable therein, FIG. 4 in a schematic partial section shows a second type of sealing device, FIG. 5 in a schematic partial section shows a third type of sealing device, FIG. 6 in a schematic partial section shows a fourth type of sealing device, FIG. 7 in an axial partial section shows the sealing arrangement according to FIG. 4, and FIG. 8 in a perspective view shows a product cassette representing the building elements of the conveyor.

The reference numeral 10 in FIG. 1 generally denotes a heat stabilization system comprising an input and output unit 11, module units 12 of the low pressure type arranged above each other, a sluice device 9 and high pressure modules 14 arranged above each other. Some of the latter modules are provided with microwave devices, if necessary at both levels.

The module units 12 and 14 basically consist of straight elements of equal length which if necessary may be provided with somewhat angled connection flanges, for obtaining for instance a bump in the path, and when interconnecting the modules to a system, as for instance in FIG. 1, there is formed a first process path in substantially one direction and a second path in the opposite direction.

In FIG. 1 said paths are parallel and located right above each other, but it is of course possible to have a lateral displacement between the paths as well as between the bumps, etc.

The module units encapsule a conveyor system comprising cassettes 7 (FIG. 8) in which the product which is to be heat stabilized is transported. The system 8 is visible only at the input and output unit 11 where it is not encapsuled. In the actual case the conveyor is arranged for transport into and out from an over-pressure zone via one and the same sluice 9, but it is of course possible to have a conveyor through one side of the sluice only, for instance the upper one if for space disposition reasons it is required a sluice at the input to the over-pressure and another at the output from the over-pressure.

The module units 12, 14 basically have the same exterior measure and size, respectively, but may be dimensioned for different pressures and may be supplemented by an insulation of different thickness depending on the process requirements and the construction of the system chosen.

It is the intention that the confinement should allow the product to be surrounded, fully or partly, by a fluid, preferably in liquid phase (water). It is also possible to use a module unit having a particularly narrow inner section for defining specific treatment zones by means of a restriction in excess to that is obtained by the actual sluice.

Figure 2:
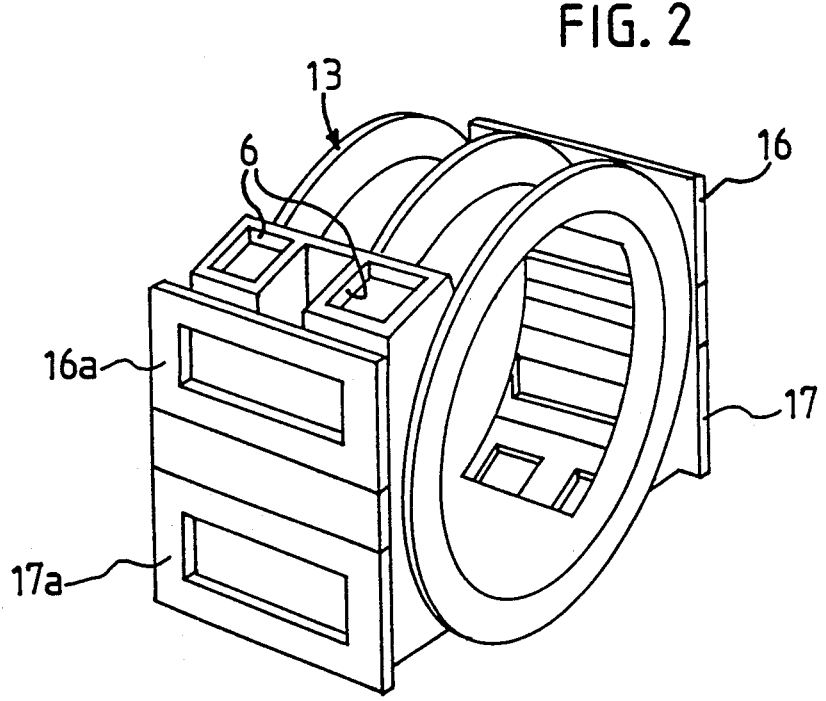

In FIG. 2 the sluice housing 13 is provided with connection flanges 16, 17 and 16a, 17a for module units 12 and 14, respectively, at both sides thereof. For the rest there are service and inspection openings 6 in the substantially circular cylindric housing 13.

Figure 3:
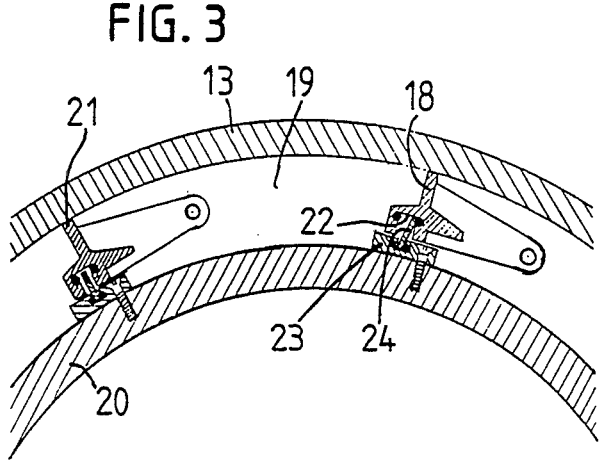

In FIG. 3 there is shown a first embodiment of radially displaceable flaps 18. Such flaps are pivotably attached to a flange 19 on the drum 20 and are uniformly distributed along the periphery of the drum.

Each flap has a radially outer sealing portion 21 designed for abutment against and sliding against the inside of the housing 13. Eventually, such portion may have an addition of a material in the region of the outer sealing 21 having suitable characteristics from a friction and sealing point of view.

At the side of the flap 18 facing the drum there is a longitudinal groove 22 in the drum extending in the generatrix direction of the drum. Sealing list supports 23, are attached to the drum and each one has a flexible sealing list 24. This list may be displaced between end positions defined by the width of the groove 22.

The higher pressure at one side of the flap presses the list 24 as far as possible in a direction towards the other side of the flap, creating a larger surface of the flap to act on for the pressure than the surface for the pressure acting in the opposite direction at the other side of the flap. The net torque obtained brings the flap 18 in sealing abutment against the inside of the housing regardless positive or negative pressure difference. The force acting against the housing has a predetermined relation relative the pressure difference and may be determined by the placement and design of the groove.

Having a suitable width of the groove the force may be adapted such that it is sufficiently large for guaranteeing abutment and sealing between the flap and the housing and sufficiently small for minimizing the friction between the flap and the housing and thereby the risk that such parts damage each other and the driving effect of the sluice.

Figure 4:
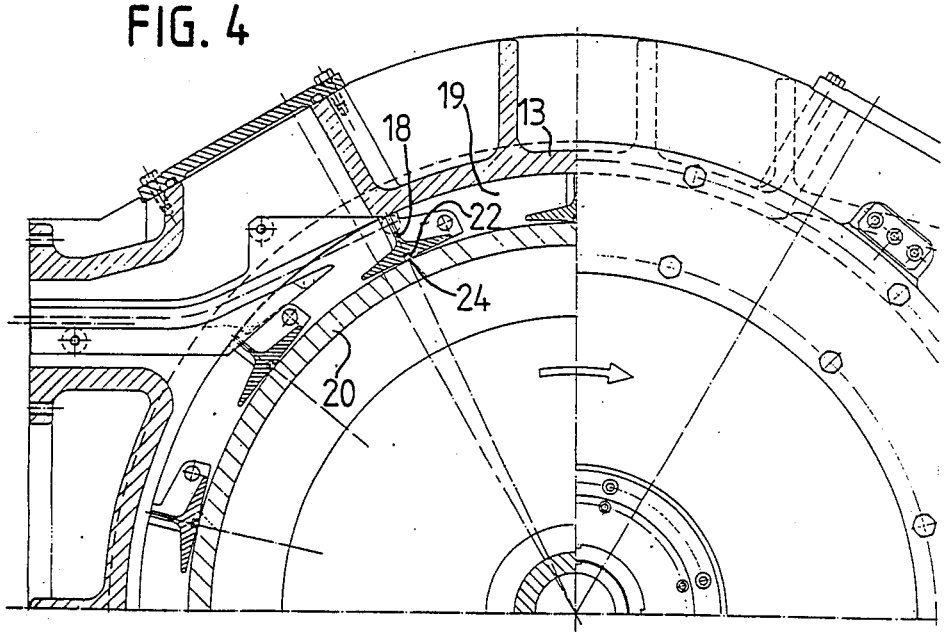

In FIG. 4 there is shown another embodiment of pivotably supported flaps 18. The longitudinal sealing member is here replaced by a string 24 having a circular section and arranged in a groove 22. In basically the same manner as the list 24 in FIG. 3, the string 24 is moveable to abutment against either of the walls of the groove dependent on the actual pressure difference acting on the flap 18. Basically the support of the flap in the flange 19 implies the same rotational movement as in FIG. 3. This rotational movement comprises a radial component of movement relative the drum 20 which causes abutment of the flap against the inside of the housing with a force related to the actual pressure difference.

Figure 5:
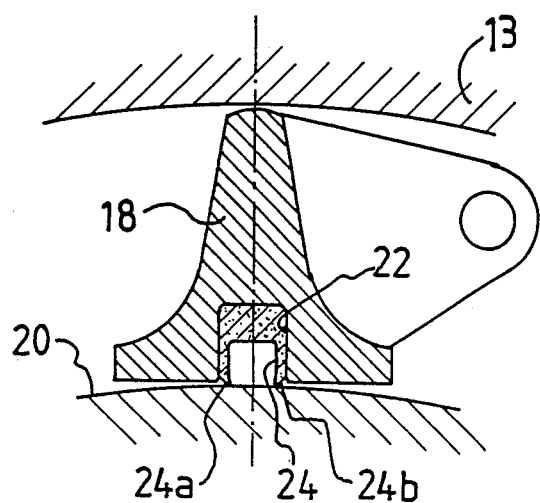

In FIG. 5 there is shown a sealing member in the shape of a U-profile 24 which has flexible sealing lips 24a, 25b facing each other. The function is basically such that either of the lips is brought into sealing position against the drum 20 dependent on the actual pressure difference between the spaces at the two sides of the flap.

Figure 6:
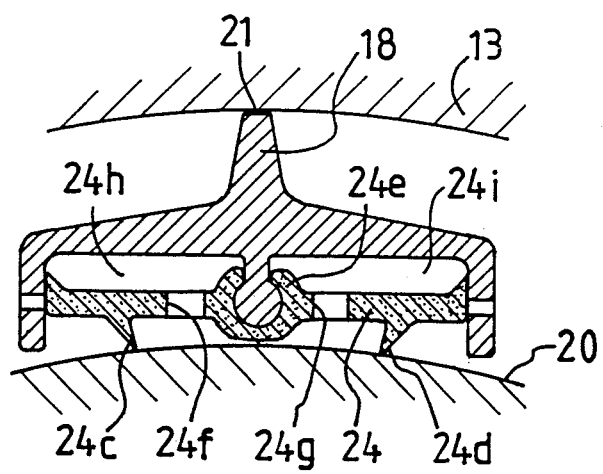

The sealing member 24 in FIG. 6 comprises a list having two lips 24c, 24d on the side of the list facing the drum and an attachment device 24e on the opposite side of the list for attaching the list in a support on the flap 18. The flap and the support are such that two chambers 24h, 24i are formed which are closed with the exception of a communication established via openings 24f, 24g between the lips on both sides of the attachment device 24e.

An over-pressure, for instance at the left side of the flap 18 passes the lip 24c and enters into i.e. the chamber 24i. The right hand portion of the sealing list is pressed downwards such that the lip 24d is pressed against the drum 20. A good sealing is hereby obtained against the drum at the lip 24d and an upwardly directed reaction force is created that guarantees abutment of the outer sealing portion 21 of the flap 18 against the inside of the housing 13.

In an analogue manner an over-pressure to the right hand side of the flap 18 would have given sealing between the lip 24c and the drum 20 and between the sealing portion 21 and the inside of the housing 13.

Figure 7:
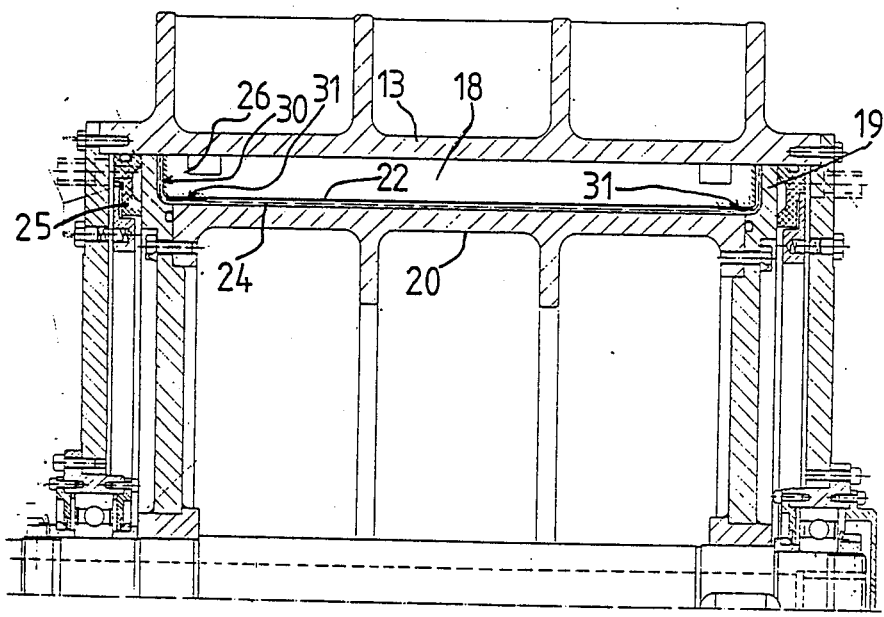

The axial extension of the flap appears from FIG. 7 where it is also shown that the flap 18 is sealed at the ends thereof against the flanges 19 of the drum by means of a list or string placed in a groove. This string may be a continuation of the string 24.

In such a case it is placed in a groove 30 at the end of the flap which is a continuation of groove 22. The groove 30 is, however, shallower than the groove 22 meaning that the string placed in the groove 30 will fix the latter one resiliently between the flanges 19 of the drum by being pressed together somewhat between the flange 19 and the flap 18.

In the same manner grooves 22 in the flap 18 at the outer portions 31 in FIG. 7 are somewhat shallower than for the rest, which means that also here the resiliency of the string 24 gives a certain force against the flap 18 which is sufficient for bringing the flap in abutment against the housing 13 also when a pressure difference has not been built up between the two sides of the sluice.

In FIG. 7 there is also shown a sealing arrangement for sealing axially against the environment comprising an axially settable, ring-shaped element 25.

Figure 8:
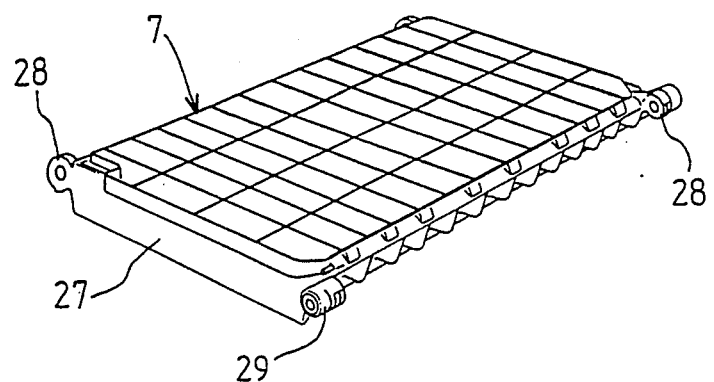

The cassette 7 in FIG. 8 forms the device surrounding the product and forms the active part of the conveyor. The side pieces 27 of the cassette are formed as links comprising joint elements 28 at each corner and dog members 29 for co-operation with driving members (not shown) on the drum or on another driving device.

In the flaps 18, FIG. 7, there are recesses 26 for the joint elements 28. The latter ones are dimensioned and arranged for sealing in the recesses.

In that case where the conveyor is driven by the drum via the dog members 29, the drum has the driving elements thereof mounted on the flanges 19, pairwise opposite each other between the flaps. The number of pairs corresponds to the number of flaps. The drum is driven by a motor (not shown).

Although there has been shown a limited number of embodiments with reference to the drawings it is realized that modifications and alternatives are possible within the frame of the inventive idea according to the accompanying claims.

We claim:

1. A sluice device for use in a device for heat stabilization and placeable between zones having different pressure conditions, comprising a drum rotatable in an opening in a housing, in a clockwise or anticlockwise direction, wherein flaps are arranged for radial displacement and are distributed along the circumference of the drum, in that each flap has a first portion for sealing against the housing, and in that a second portion of the flap, adjacent to the drum, comprises an elongated sealing member extending in the longitudinal direction of the drum and having a portion which may be displaced between two positions relative the drum, such that the flap due to the pressure difference is brought in sealing abutment against the inside of the housing, regardless of the positive or negative pressure difference between said zones.

2. A device according to claim 1, having a joint device interconnecting each flap and the drum such that a rotational movement of a joint device comprises a radial component of movement of the flap relative the drum.

3. A device according to claim 1, wherein the movement of each flap is guided by radial grooves in flanges on the drum.

4. A device according to claim 1, having an inlet gap for the passage of a conveyor is formed in the drum and the housing, wherein each flap has recesses in said first portion thereof, that the conveyor comprises links and joint elements, and that the joint elements are arranged for sealingly being accommodated in the recesses.

5. A device according to claim 4, wherein the combination of links and drum forms the transmission of the driving force from a drive motor driving the drum to the conveyor by dog members cooperating with driving members on the drum.

6. A device according to claim 1, wherein said second portion of each flap has a longitudinal groove which is open against the drum and wherein said elongated sealing member has at least a portion which may be displaced between two positions in the groove, wherein a pressure difference between the spaces on the two sides of the flap brings a longitudinal sealing member in such a sealing position that the flap due to the pressure difference is brought in sealing abutment against the inside of the housing, regardless of the positive or negative pressure difference, with a predetermined force relative to the pressure difference.

7. A device according to claim 6, wherein the sealing member may be displaced crosswise the groove between end positions determined by walls defining the width of the groove.

8. A device according to claim 6, wherein the sealing member comprises a U-profile having flexible sealing lips facing each other.

9. A device according to claim 6, wherein the sealing member comprises a side portion of the sealing member having two lips on the side of the side portion facing the drum and an attachment device on the opposite side of the side portion for attaching to a support such that two chambers communicating via openings between the lips on both sides of the attachment device are formed.

10. A device according to claim 7, wherein said sealing member comprises a string of rubber having a circular cross section.

11. A device according to claim 7, wherein said sealing member comprises a side portion of the sealing member which is resiliently attached to the drum.

12. A device according to claim 1, wherein the sluice device is included in a substantially straight conveyor system comprising a conveyor in a first direction and a conveyor in the return direction, and in that the conveyor, in sections of a plant where the stabilization process is carried out, is encapsuled in module units preferably dimensioned for one pressure at one side of the sluice device and another pressure at the other side of the sluice device.

13. A device according to claim 12, wherein a double length of each module unit corresponds to an integral number multiple of a length of one link of the conveyor.

* * * * *